United States Patent [19]

Carbon et al.

[11] Patent Number: 4,817,513
[45] Date of Patent: Apr. 4, 1989

[54] CONE BAKER

[76] Inventors: Donald A. Carbon, 105 Days Ave., Buchanan, Mich. 49107; Frederick S. Carbon, deceased, late of Buchanan, Mich., by Donald A. Carbon, executor

[21] Appl. No.: 104,431

[22] Filed: Oct. 5, 1987

[51] Int. Cl.[4] .............................................. A47J 37/00
[52] U.S. Cl. ........................................ 99/383; 99/372
[58] Field of Search ................ 99/372, 376, 377, 380, 99/382, 383, 384, 426, 427, 428, 431, 439, 442, 374; 219/524, 525; 249/122, 120, 64, 63; 425/414

[56] References Cited

U.S. PATENT DOCUMENTS

| | | | |
|---|---|---|---|
| 1,019,238 | 3/1912 | Flagstad | 99/383 |
| 1,063,981 | 6/1913 | Lanier | 99/383 |
| 1,346,338 | 7/1920 | Robinson | 99/383 |
| 1,750,497 | 3/1930 | Tallent | 99/383 |
| 1,776,431 | 9/1930 | Hamwi | 99/383 |
| 2,125,589 | 8/1938 | Shuman | 99/383 |
| 4,386,557 | 6/1983 | Meraj et al. | 99/372 |

Primary Examiner—Henry J. Recla
Assistant Examiner—Linda J. Sholl
Attorney, Agent, or Firm—James D. Hall

[57] ABSTRACT

A baker for food items such as ice cream cones or the like. The baker includes a mold and a core positioned on a stationary frame. The mold and core closely approximate the shape of the food item and include heating elements to cook batter poured into the mold cavity to form the food item.

8 Claims, 4 Drawing Sheets

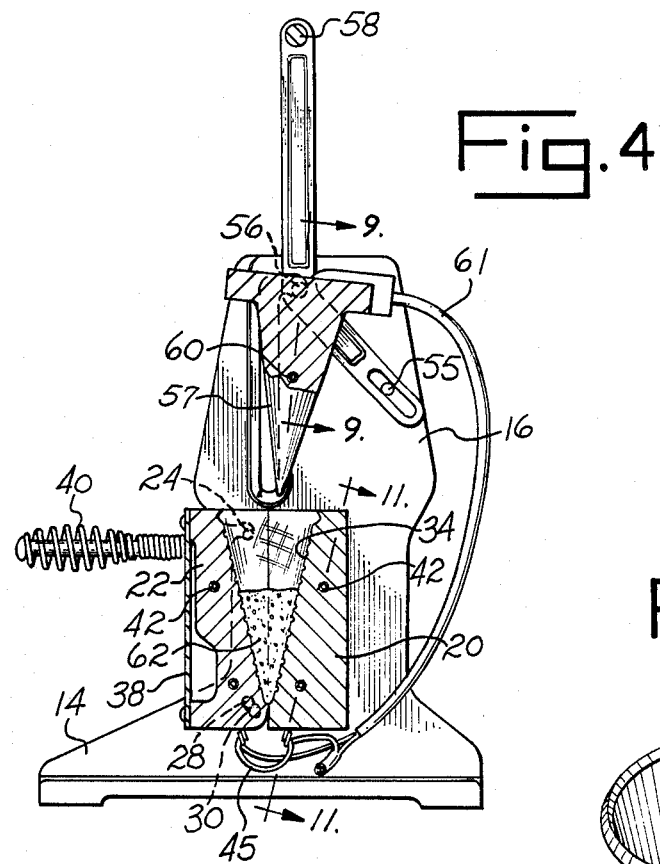
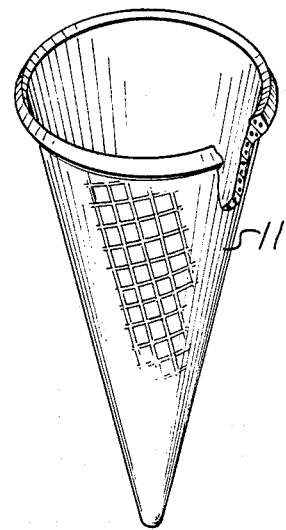
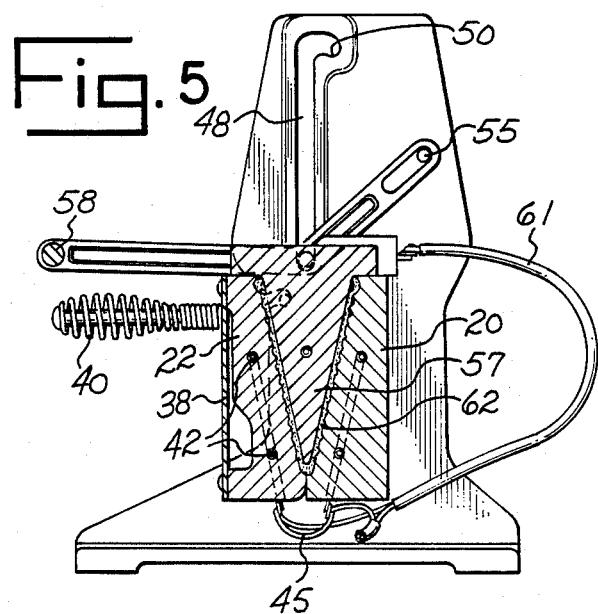

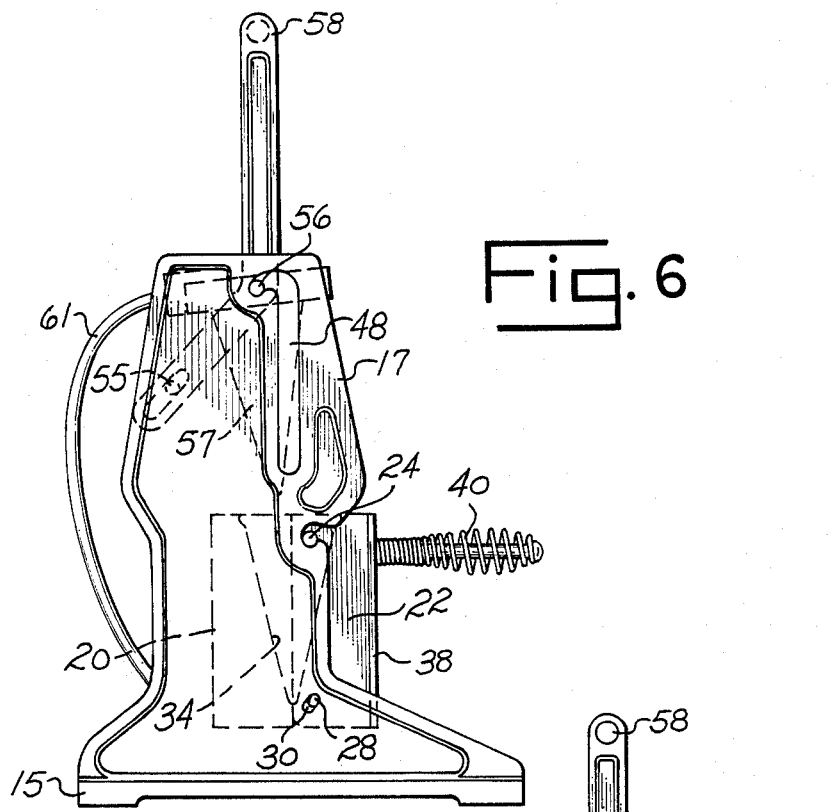
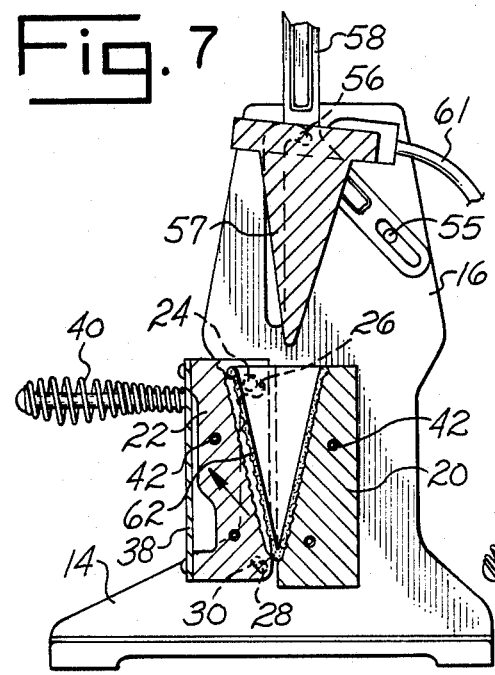
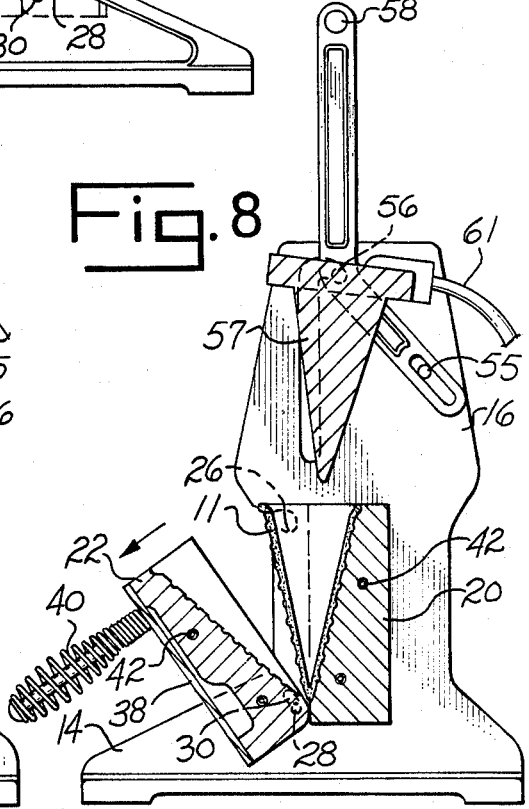

CONE BAKER

SUMMARY OF THE INVENTION

This invention relates to a baker for food items and will have special application to a baker for ice cream cones.

The baker of this invention includes a mold assembly and a core assembly. The mold and core assemblies are pivotally connected to a frame. Heating elements are positioned in the mold and core assemblies to heat batter which is poured into the mold cavity to form the cone or related food item.

Accordingly, it is an object of this invention to provide an improved baker which is for cooking food items such as ice cream cones or the like.

Another object of this invention is to provide for a cone baker which is reliable and durable.

Another object of this invention is to provide for a cone baker which allows for rapid removal of the finished cones.

Other objects of this invention will become apparent upon a reading of the following description

BRIEF DESCRIPTION OF THE DRAWINGS

A preferred embodiment of the invention has been depicted for illustrative purposes wherein:

FIG. 4 is a sectional view taken along line 4—4 of FIG. 2.

FIG. 6 is a sectional view taken along line 5—5 of FIG. 3.

FIG. 6 is a side elevational view of the cone baker of FIG. 3.

FIG. 7 is a fragmentary sectional view similar to FIG. 4 after baking of the cone.

FIG. 8 is a fragmentary sectional view of the cone baker similar to FIG. 7 showing the mold being opened to expose the finished cone.

FIG. 12 is a perspective view of a cone produced by the baker of FIGS. 1-11.

DESCRIPTION OF THE PREFERRED EMBODIMENT

Figure 1:
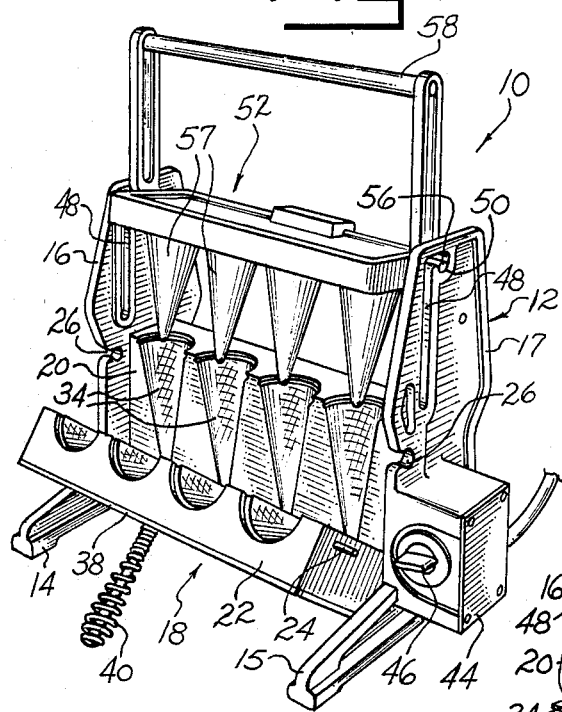
FIG. 1 is a perspective view of the cone baker with the mold assembly in the open position.

The preferred embodiment herein described is not intended to be exhaustive or to limit the invention to the precise form disclosed. It is chosen and described to explain the principles of the invention and its application and practical use to enable others skilled in the art to utilize the invention.

Referring now to FIGS. 1-8, the reference numeral 10 generally designates the cone baker of this invention. Cone baker 10 operates to form cones 11 as seen in FIG. 12. It is understood that the principles of the invention could be applied to form any type of formed food receptacle such as edible salad bowls and banana split and sundae boats to name a few. Baker 10 includes a generally upright frame 12 which has base legs 14, 15 and upright frame parts 16, 17 which may be integrally forged or cast as a single piece unit.

Figure 2:
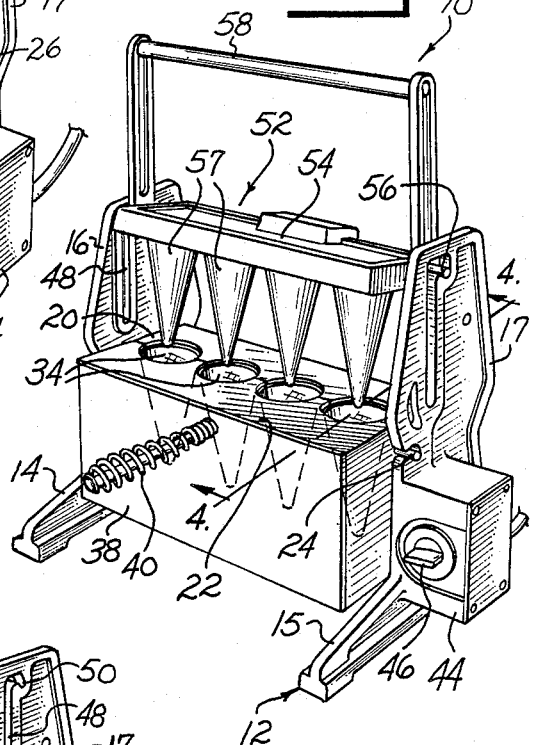
FIG. 2 is a perspective view of the cone baker with the mold assembly in the closed position.
Figure 3:
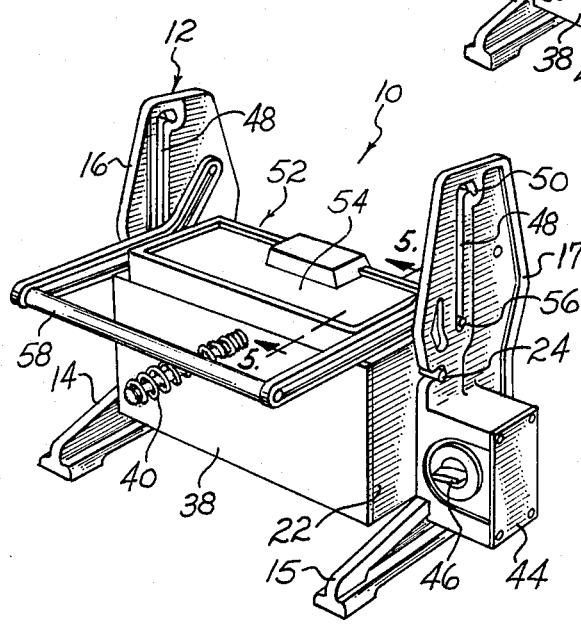
FIG. 3 is a perspective view of the baker with the core assembly in the baking position.

Frame 12 also includes a mold assembly 18. Mold assembly 18 includes mold parts 20, 22. Mold part 20 is fixedly connected between frame parts 16 and 17. Mold part 22 is pivotally connected between frame parts 16, 17 by lower pivot pins 28 fitted into frame part slots 30 (FIG. 4) and is anchored in its closed position by upper pins 24, which fit into frame part notches 26. This pivot connection allows mold part 22 to be swung between an open position (FIGS 1 and 8) and a closed position (FIGS. 2 and 7). Each mold part 20, 22 defines one or more cavities 34 (four shown) which may be arranged linearly as shown, in pairs, or in other formations dependent upon the specific needs. The exposed surface of each mold part 20, 22 at each cavity 34 closely approximates the exterior shape and configuration of cone 11. Mold part 22 may also include a front shield 88 and a handle 40 as seen in FIGS. 1 and 8. Heating elements, such as metal rods 42, are positioned in each mold part 20, 22 and are electrically connected to a central control box 44 through leads 45. Control box 44 includes a timer dial 46.

Figure 9:
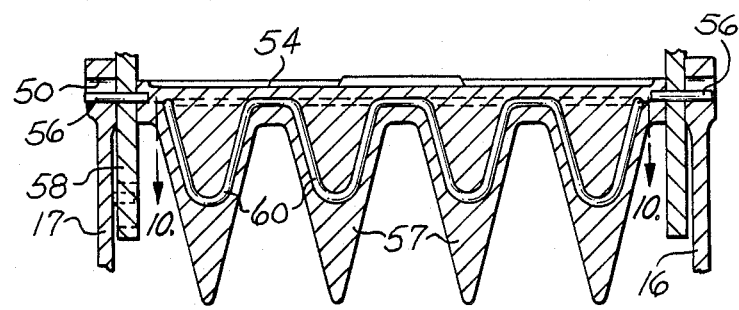
FIG. 9 is a cross-sectional view taken along line 9—9 of FIG. 4.
Figure 10:
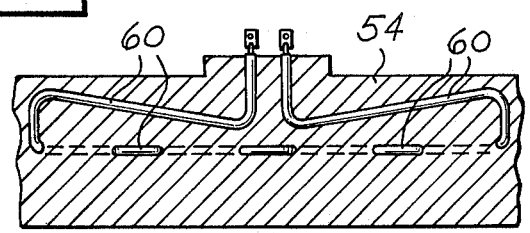
FIG. 10 is a cross-sectional view taken along line 10—10 of FIG. 9.
Figure 11:
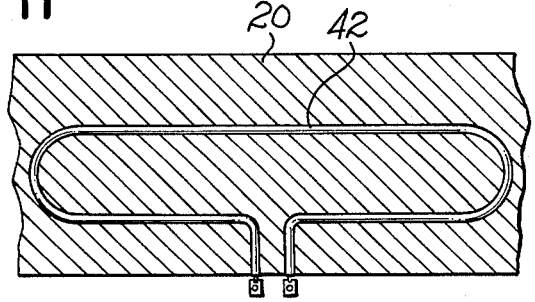
FIG. 11 is a cross-sectional view taken along line 11—11 of FIG. 4.

Each frame part 16, 17 defines an elongated vertically oriented slot 48 which terminates at its upper end in a cradle-like support recess 50. A core assembly 52 includes an upper plate 54 which has pin 56 positioned for movement within slots 48. One or more cores 57 (four shown) extend from plate 54 and are fitted with slight clearance (dependent on the desired thickness of the food item) into mold cavities 84 to form cone 11. Core assembly 52 may also include a handle 68 pivotally attached to core plate pins 56 and to frame parts 16. 17 through stationary pins 85 which allow for rapid raising and lowering of the core assembly. Heating elements, such as metal rods 60, may be positioned in core assembly 62 as shown in FIGS. 9-11 and are electrically connected to central control box 44 through leads 61.

To form a cone 11, baker 10 is operated as follows. With mold parts 20, 22 in the closed position and core assembly 52 in the up position (FIG. 2), heating elements 42 and 60 are switched on and the timer is set through control dial 46. Cores 57 and the walls of cavities 34 should preferably be coated with oil or other release agent prior to use. A suitable amount of batter 62 is introduced into one or more of the mold cavities 34 as seen in FIG. 4 after the baker is preheated. Core assembly 52 is then lowered along pins 56 in slots 48 into the down position of FIGS. 3, 5 and 6 to form batter 62 into the shape of cone 11. After cooking for a suitable time period, core assembly 52 is lifted into the up position (FIG. 7). Mold part 22 is then lifted and then swung outwardly into the open position of FIG. 8 by lifting (FIG. 7) and pulling (FIG. 8) on handle 40 and the finished cones 11 are removed. The cycle may then be repeated.

It will be obvious that pre-heating of the baker will shorten the cooking cycle. Also, that if cones are formed and cooked repeatedly or successively in volume, the baker will retain much of its heat. As a consequence, the cooking time will be shortened for each successive cycle, necessitating the resetting of the timer for such a shorter cooking cycle.

It is understood that the above description does not limit the invention to the given details, and that it may be modified within the scope of the following claims.

We claim:

1. A baker for a food receptacle, said food receptacle being formed from flowable batter, said baker comprising a frame, said frame including a mold which defines a mold cavity having a wall and two spaced upright frame parts, said cavity wall closely approximating the exterior configuration of said food receptacle, and a core which closely approximates the interior configuration of said food receptacle, said core fittable into said mold cavity, and heating means positioned in one of said mold and core for cooking said batter to produce said food item, said core swingably connected to said frame between an up position spaced from said mold wherein said batter may be introduced into said mold cavity and a down position within said mold cavity, said frame including base legs connected to spaced upright frame parts, each frame part having an elongated vertical opening therethrough, said core including a mounting plate, said mounting plate including a pin vertically slidable in each opening, said pins in said openings constituting means for sliding said core between its said up and down positions said pins being positioned on said mounting plate in a direction perpendicular to the movement of said core.

2. The baker of claim 1 wherein said mold includes a first mold part fixedly connected to said frame, and a second mold part pivotally connected to each frame part by a pin fitted in a recess of each frame part, said second mold part being shiftable between a closed position abutting said first mold part during baking and batter-pouring operations and an open position spaced from said first mold part wherein said food item may be removed from the mold cavity.

3. The baker of claim 1 including timer means for regulating cooking time of said food items.

4. The baker of claim 1 wherein said heating means is positioned in both said mold and said core.

5. The baker of claim 2 wherein said heating means is positioned in said mold parts.

6. The baker of claim 1 wherein each frame opening defines an upper recess spaced from the opening and continuous therewith, said pins in said recess constituting means for retaining said core in said up position.

7. The baker of claim 6 and a handle extending upwardly from and connected to said core mounting plate, said handle including a cross member oriented generally transverse to said frame parts and normal to said frame part openings.

8. The baker of claim 7 wherein said handle is pivotally connected to said frame by pivot pins.

* * * * *